United States Patent
Ramey

(10) Patent No.: US 11,640,727 B2
(45) Date of Patent: May 2, 2023

(54) RACE TIME REPORTING SYSTEM

(71) Applicant: Kelly Ramey, Houston, TX (US)

(72) Inventor: Kelly Ramey, Houston, TX (US)

(73) Assignee: Kelly Ramey, Houston, TX (US)

( * ) Notice: Subject to any disclaimer, the term of this patent is extended or adjusted under 35 U.S.C. 154(b) by 0 days.

(21) Appl. No.: 17/657,909

(22) Filed: Apr. 4, 2022

(65) Prior Publication Data
US 2022/0230475 A1    Jul. 21, 2022

Related U.S. Application Data

(63) Continuation of application No. 15/911,898, filed on Mar. 5, 2018, now Pat. No. 11,295,554.

(60) Provisional application No. 62/509,487, filed on May 22, 2017, provisional application No. 62/466,737, filed on Mar. 3, 2017.

(51) Int. Cl.
| | |
|---|---|
| *G07C 1/24* | (2006.01) |
| *A63B 71/06* | (2006.01) |
| *G06F 16/9535* | (2019.01) |
| *G06K 19/077* | (2006.01) |
| *A63B 24/00* | (2006.01) |

(52) U.S. Cl.
CPC ............ *G07C 1/24* (2013.01); *A63B 24/0021* (2013.01); *A63B 71/0616* (2013.01); *A63B 71/0686* (2013.01); *G06F 16/9535* (2019.01); *G06K 19/07762* (2013.01); *A63B 2225/54* (2013.01)

(58) Field of Classification Search
CPC ... G07C 1/24; A63B 24/0021; A63B 71/0616; A63B 71/0686; A63B 2225/54; G06F 16/9535; G06K 19/07762; G06Q 10/02
USPC ........................................................ 340/926
See application file for complete search history.

(56) References Cited

U.S. PATENT DOCUMENTS

| | | | |
|---|---|---|---|
| 9,704,004 B1 * | 7/2017 | Sielaff | G06Q 10/08 |
| 11,295,554 B2 * | 4/2022 | Ramey | A63B 24/0021 |
| 2009/0184806 A1 * | 7/2009 | Kia | G06Q 90/00 340/10.52 |
| 2012/0303753 A1 * | 11/2012 | Hansen | A63B 24/0021 709/217 |
| 2014/0263633 A1 * | 9/2014 | Schmucker | G16H 40/40 235/385 |
| 2015/0302235 A1 * | 10/2015 | Kelly | G06K 7/10425 340/10.1 |
| 2016/0132588 A1 * | 5/2016 | Duncan | G06Q 10/02 235/494 |

* cited by examiner

*Primary Examiner* — Eric Blount
(74) *Attorney, Agent, or Firm* — Ramey LLP

(57) ABSTRACT

An event administration system is disclosed with a server connected to the internet to present a registration webpage to a remote event participant desiring to attend an event; a database connected to the server, the database stores information about the event participant and the event; an administrator module operated by an administrator of the system, the administrator can create and edit the event. The system allows registration register until the event starts and after the start of the event and can also provide a profile for participants that keeps track of their event statistics.

20 Claims, 3 Drawing Sheets

RACE TIME REPORTING SYSTEM

CROSS-REFERENCE TO RELATED APPLICATIONS

This application is a continuation of U.S. No-provisional Application Ser. No. 15/911,898 Filed Mar. 5, 2018, which claims the benefit of U.S. Provisional Application No. 62/509,487, filed May 22, 2017, and U.S. Provisional Application No. 62/466,737, filed Mar. 3, 2017; all of which are hereby incorporated by reference in their entirety.

FIELD

The disclosure relates generally to sports activities. The disclosure relates specifically to a method and system for managing race information.

REFERENCE TO A COMPUTER PROGRAM LISTING APPENDIX SUBMITTED ON A COMPACT DISC

The material on the two copies of a compact disc is hereby incorporated by reference and found in the Appendix. The names of the compact discs are 20070010NPUSO0c1 and 20070010NPUS00c2. Each compact disc contains the following files with the date of creation and file size for each file listed below.

| | | |
|---|---|---|
| .meteor | | |
|   .finished-upgraders | | 1000 bytes |
|   .gitignore | | 1000 bytes |
|   .id | | 1000 bytes |
|   packages | | 2000 bytes |
|   platforms | | 1000 bytes |
|   release | | 1000 bytes |
|   versions | | 3000 bytes |
| .test__data | | |
|   import | | 1000 bytes |
| .vscode | | |
|   typings | | |
|     meteor.d | | 56000 bytes |
|   settings.json | | 1000 bytes |
| client | | |
|   routers | | |
|     router | | 6000 bytes |
|   styles | | |
|     main | | 1000 bytes |
|     theme.min | | 115000 bytes |
|   views | | |
|     admin | | |
|       races | | |
|         race | | |
|           delete-modal | | |
|             delete-race-modal | | 1000 bytes |
|             delete-race-modal | | 1000 bytes |
|           times | | |
|             admin-race-times | | 4000 bytes |
|             admin-race-times | | 4000 bytes |
|           upload-modal | | |
|             upload-race-image | | 1000 bytes |
|             upload-race-image | | 2000 bytes |
|             upload-race-times | | 1000 bytes |
|             upload-race-times | | 1000 bytes |
|           admin-race | | 3000 bytes |
|           admin-race | | 4000 bytes |
|         venue | | |
|           edit-venue-modal | | 4000 bytes |
|           edit-venue-modal | | 3000 bytes |
|         admin | | 5000 bytes |
|         admin | | 3000 bytes |
|     common | | |
|       common | | 3000 bytes |
|       default | | 2000 bytes |
|     dashboard | | |
|       dashboard | | 4000 bytes |
|       dashboard | | 1000 bytes |
|     profile | | |
|       profile | | 4000 bytes |
|       profile | | 4000 bytes |
|     profiles | | |
|       sub-profile | | 2000 bytes |
|       sub-profile | | 2000 bytes |
|     races | | |
|       race | | |
|         donate-modal | | |
|           donate-modal | | 1000 bytes |
|           donate-modal | | 1000 bytes |
|         qr-modal | | |
|           qr-modal | | 2000 bytes |
|           qr-modal | | 1000 bytes |
|         register-modal | | |
|           register-modal | | 2000 bytes |
|           register-modal | | 3000 bytes |
|         times | | |
|           times | | 2000 bytes |
|           times | | 1000 bytes |
|         race | | 3000 bytes |
|         race | | 2000 bytes |
|       races | | 2000 bytes |
|       races | | 1000 bytes |
|     venues | | |
|       venue | | |
|         venue | | 2000 bytes |
|         venue | | 2000 bytes |
|     verify | | |
|       privacy-content | | 6000 bytes |
|       verify | | 4000 bytes |
|       verify | | 3000 bytes |
|     welcome | | |
|       welcome | | 1000 bytes |
|       welcome | | 1000 bytes |
|   client | | 1000 bytes |
| less | | |
|   variables.less | | 16000 bytes |
| libs | | |
|   collections | | 6000 bytes |
|   utils | | 5000 bytes |
| public | | |
|   images | | |
|     hwp | | 6000 bytes |
|     race-group | | 716000 bytes |
| server | | |
|   libs | | |
|     methods | | 10000 bytes |
|     publications | | 2000 bytes |
|     server | | 2000 bytes |
| .gitignore | | 1000 bytes |
| LICENSE.md | | 1000 bytes |
| OPENSOURCE.md | | 1000 bytes |
| package.json | | 2000 bytes |
| README.md | | 1000 bytes |

BACKGROUND

In the course of organizing a race, there are registration systems that can automatically assign bib numbers. However, this is during pre-registration for races and the bib numbers/assignments are only accessed by the race management. Race management then has to download the assignments to a spreadsheet and the bibs are manually assembled and handed out at a packet pick-up, not the day of the race unless prior arrangement has been made by the participant. Most races cut off registration a few days prior to the race, which causes a problem in that many potential participants do not have a chance to register. Most race results are loaded to the web site of the timer only. There are a few web sites where participants can create a profile to keep track of their results but the users must manually load their own results.

It would therefore be advantageous to have a system that facilitates registration and provide more chances for participants to register. Further, it would be advantageous for event participants to receive their event number at the time of registration.

SUMMARY

An embodiment of the disclosure is a system for race reporting comprising a server operationally connected to the internet to present a registration webpage to a race participant desiring to attend a race, wherein it is possible for the participant to register up and after the race starts; software; a database connected to the server, the database storing registration information created by the participant; a plurality of chip cards; and a plurality of chip card readers and writers to read and write the chip cards. In an embodiment, the chip cards are reusable. In an embodiment, the chip cards are RFID bibs. In an embodiment, the system further comprises an administrator module wherein at least one selected from the following can be performed an existing race or venue can be edited or new races and venues can be created. In an embodiment, information is exported from the administrator module to the race director software. In an embodiment, the information is in a CSV file. In an embodiment, information is imported from the race director software to the administrator module. In an embodiment, the information is in a CSV file. In an embodiment, the administrator module displays at least one of the following Total users online, Total users, Total registrations made, All races, All venues, and All users and their personal information. In an embodiment, the registration webpage is generated by the server by extracting an associated record for the participant from the database and creating a user interface. In an embodiment, the participant has a profile. In an embodiment, the profile comprises Total Races Run, Personal Record Race Time, Total Distance Run, and Total Time Run. However, any data can be collected or added as would be understood by one of ordinary skill in the art.

An embodiment of the disclosure is a system for race time reporting comprising a server operationally connected to the internet to present a registration webpage to a remote race participant desiring to attend a race; a database connected to the server, the database storing registration information created by the participant; a plurality of chip cards; and a plurality of chip card readers and writers to read and write the chip cards. In an embodiment, the chip cards are reusable. In an embodiment, the system further comprises an administrator module wherein existing races or venues can be edited, and new races and venues can be created. In an embodiment, the reusable chip cards are RFID bibs, chips, and/or the like. In an embodiment, the registration webpage is generated by the server by extracting an associated record for the participant from the database and creating a user interface.

In an embodiment, the system can integrate a GPS navigation system. A participant can carry a mobile unit which features software allowing a processor to communicate with an inertial navigation system which collects racing information, with a remote server which features software for processing the racing information of all participants, the mobile unit collects, processes, saves and transmits participant specific racing information continuously throughout the race to the remote server. The server processes and evaluates the received racing information and compares the information of all users.

In various embodiments, systems of the present invention can incorporate a payment processing facility that allows a user or registrant to pay for one or more races. In an embodiment, the payment processing facility is capable of authorizing a user or registrants account for a chosen race to allow recordation by the associated race time reporting system.

In various embodiments, race participants are assigned a race number or bib number at the time of registering for one or more race events such that the registration process and/or bib assignment for the one or more race events is complete before the race participant attends the one or more race events, whereby the race participant knows their race number or bib number before the one or more race events. In various further embodiments, the race number or bib number assignment is complete at the time of registration and the race participant knows their race or bib number. In various such embodiments, the race participant can request from race organizers on race day their particular bib or race number rather than being assigned a number through packet pickup or on-site registration. Such requests for a race or bib number can be made verbally, by displaying the bib or race number on a PDA, smart phone, phone or other device capable of displaying electronic communications.

Various further embodiments of the present invention comprise a system for event administration comprising: a user interface; a management platform comprising software and a server operationally connected to the Internet; an event; and, at least one event participant, wherein the at least one event participant accesses the management platform to register for the event; wherein the management platform assigns an event number for the event to the event participant at the time of registration for the event and communicates the event number to the event participant; and, wherein the event participant is able to participate in the event without further requirements. In various events, the event is selected from one of a foot race, a bike race, a trail race, a swim race, a car race, a boat race, a flying race, a balloon race, and any other race wherein a race registrant requires the assignment of an event number, or bib number. Further embodiments comprise an event timing system. Various further embodiments comprise an event timing system operationally connected to the management platform.

Accordingly, it is an object of the present disclosure to provide a race administration system optionally with an integrated time reporting system or event timing system. The management system allows registration until the race starts and, in alternate embodiments, after the start of the race. In various embodiments, the timing system comprises reusable chip cards being used as a timing device. The management system also provides a profile for participants that keeps track of their racing statistics without the participant having to add his/her statistics. In various embodiments, participants have the option of adding data to their profile such as height, weight, medical conditions and the like. In various further embodiments, participants may use their profile for tracking their statistics over time.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
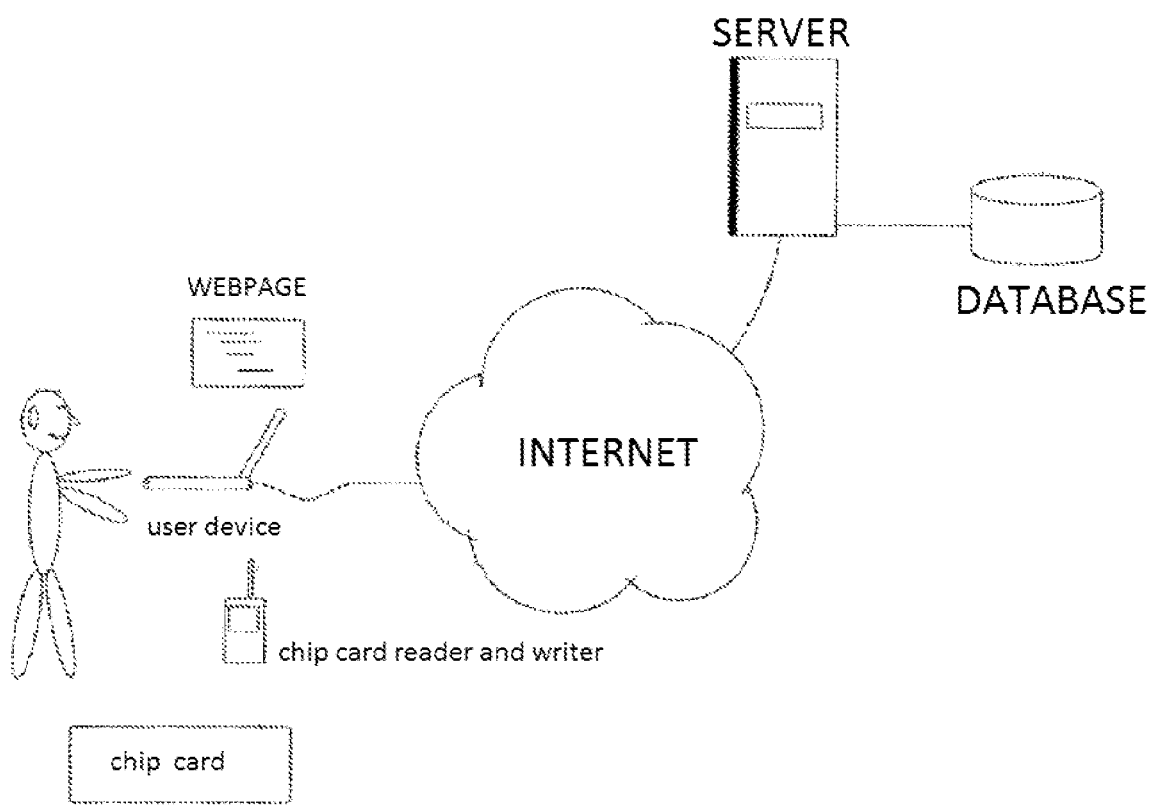
FIG. 1 is a block diagram of a system for providing race registration and time reporting in accord with one possible embodiment of the present disclosure.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure can be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Collegiate Dictionary 11$^{th}$ Edition.

The term race or race event means and refers to a foot race, a bike race, a trail race, a swim race, a car race, a boat race, a flying race, a balloon race, and any other race wherein a race registrant requires the assignment of an event number. In an embodiment, the race event is a foot race, such as a 5 k, 10 K, marathon, ultramarathon, or the like. However, any distance foot race or race is envisioned with various embodiments of the present invention. Likewise, any race event can be of any distance.

The present disclosure relates to a system for providing race registration and optionally time reporting. In an embodiment, the system generally includes a database, a plurality of chip cards and a plurality of chip card readers and writers. In an embodiment, the chip cards are reusable. In an embodiment, the reusable chip cards are RFID bibs. In an embodiment, any other chip card capable of meeting the requirements of the system can be utilized. In an embodiment, the bib has an RFID tag attached. In other embodiments, the RFID is the bib. In further embodiments, the RFID replaces the bib. In an embodiment, the bibs containing the RFID tags are collected from the race participants after the race. In an embodiment, the participant keeps the RFID tag for the next race. In further embodiments, the participant returns the RFID after the race event. In an embodiment, the information on the RFID tag is erased or written over. In an embodiment, the chip card reader is a RFID reader. In an embodiment, the chip card writer is a RFID writer. In an embodiment, a RFID reader/writer can be utilized. The chip card readers and writers can be either stationary or mobile. In an embodiment, the data on the chip card can be written over so that the chip card can be reused.

The management system allows registration until the race starts and after the start of the race with a reusable chip card being used as a timing device. In an embodiment, QR codes can be utilized. The system also provides a profile for participants that keeps track of their racing statistics without the participant having to do anything. In an embodiment, it will not be necessary for participants to go to a packet pick-up before the day of the race. In an embodiment, the participant will receive a check-in code to display on their smart device to check-in on the day of the race.

In various embodiments, race participants are assigned a race number or bib number at the time of registering for one or more race events such that the registration process and/or bib assignment for the one or more race events is complete before the race participant attends the one or more race events, whereby the race participant knows their race number or bib number before the one or more race events. In various further embodiments, the race number or bib number assignment is complete at the time of registration and the race participant knows their race or bib number. Such systems are improvements over the prior art for at least the reason that race organizers no longer need to assign bib or race numbers to race participants because such assignment happens automatically thereby creating a better race registration system.

In various such embodiments, the race participant can request from race organizers on race day their particular bib or race number rather than being assigned a number through packet pickup or on-site registration. Such requests for a race or bib number can be made verbally, by displaying the bib or race number on a PDA, smart phone, phone or other device capable of displaying electronic communications.

FIG. 1 is a block diagram of a system for providing race registration and time reporting 100, in accordance with various embodiments. A participant 102 can access the internet 104 with a user device 106 such as a computer or a smart phone to provide information regarding their race registration. In an embodiment, the software utilized in the system is comprised of the code found in the Appendix. In an embodiment, any other code capable of achieving the aspects of the system disclose herein can be utilized. In an embodiment, the participant can provide payment via computer or smart phone. A server 108 presents a webpage user interface 110 with several menus to the user to be displayed on the user device 106. The server 108 also accesses a local or remote database 112 to store and retrieve information about race registration and time reporting. In an embodiment, the system utilizes a chip card 114 and chip card reader and writer 116. In an embodiment, the system can be utilized for a track meet. In an embodiment, the system can be utilized for a road or trail race. In an embodiment, the system can be used for a bicycle race or a triathlon race. In an embodiment, the system can be utilized for any event with registration and tracking. In an embodiment, the system can be utilized for dog or horse racing. In an embodiment, the chip can provide global positioning system (GPS) information in order to determine the location and route taken of a participant.

In an embodiment, the server contains at least one processor, various memory devices such as read-only memory, random access memory, hard disks, and other types of memory devices. The database is generally stored on at least one hard disk or other mass storage device. The server contains at least one communication module allowing access to the internet or other networks (such as private networks). The server, as well as user devices, can communicate by wired or wireless techniques.

In an embodiment, the system provides an advantage to prior art race registration systems because a management system of the present invention is capable of taking registration of an event participant until the race starts and, in further embodiments, after the race starts. In various embodiments, race participants access the management system through a user interface.

In further embodiments, the system provides an advantage to a race timing system because it provides reusable chip cards. In an embodiment, the system provides an advantage to a race timing system because it automatically uploads the participant information before the race. In an embodiment, the system provides an advantage to a race timing system because it automatically downloads the race information after the race. In further embodiments, the race information, including at least timing results of the race, is downloaded from a race timing system to a race management system of the present invention.

In an embodiment, the database can sort information in various manners. In an embodiment, the database can store the following information:

Race
  Name
  Sponsor
  Date
  Check in time
  Start time
  Image
  Description
  Race is open
  Race is published
  Race registrations/times
  Date race created
  Date race last updated
  Venue of the race
User
  User name
  Email address
  Date user created
  Profile of user
  Location of the user
  If user account is verified
Race registration
  ID (bib number)
  User
  Time (if race was run) in seconds
  Age group at time of registration
  Age at time of registration
  Gender at time of registration
  Date registered
Race venue
  Name of the race venue
  Address
  Location
  Kilometers of the race venue (or other measure of distance)
  When the race venue was created
  When the race venue was last updated In an embodiment, the database stores the information above. In an embodiment, the database stores less than the information above. In an embodiment, the database stores more than the information above. In an embodiment, the database stores the user's password.

In an embodiment, the server can access the database through the use of application programming interface (API) functions and can generate static and dynamic webpages from data supplied by the database. The webpage can be viewed by a user using an internet browser running on a user device. A webpage can be generated by a server by extracting the associated record for the participant from the database and creating a graphical, textual, tactile, aural, or other similar modality user interface representation of that device that the user can access via, for example, an internet browser. In an embodiment, the user can view their profile via an application for a smart device.

A user can create an account with the system platform. In an embodiment, the user can visit the webpage user interface and create an account. In an embodiment, the user can create an account via an application for a smart device. In an embodiment, the account creation process will verify that the user is human by using a Google ReCAPTCHA, or other suitable method of determining that the user is human, ask for their agreement to the policies, and collect Children's Online Privacy Protection Act (COPPA) information if necessary. In an embodiment, if a race participant is not 13 years old, the system will provide a parent approval form on which a parent must provide a signature.

In an embodiment, a person that has an email address can register for an account. In an embodiment, a child that has an email address can register for their own account. In an embodiment, a phone number can be used as an identifier to register for an account. In an embodiment, the phone number is a cell phone number. Families that have small children (in an embodiment, as young as 5 years old) can add a child to their own account. The child will show up in the race results lists if the child ran with a chip card to track their result but the child will not have their own dashboard. In an embodiment, the dashboard is reserved for a full user (adult or child) with an email address or phone number. In an embodiment, the system will give the option for a child on a parent account to move up to a separate account when they are older and have an email address. In an embodiment, the child's data from previous races under a parent's, adult's, or other participant's account will migrate to the child's own account.

In an embodiment, after creating an account, the user will be taken to his/her dashboard. In an embodiment, from the dashboard, the user can click the "Profile" button to edit their profile. From the dashboard, the user can see his/her statistics, including but not limited to:

Total Races Run
Personal Record (PR) Race Time
Total Distance Run (e.g., Kilometers (KM))
Total Time Run In an embodiment, the user can add a picture to their profile. In an embodiment, the profile can contain the names and dates of the races run. In an embodiment, the profile can display the races by different distances of races. In an embodiment, the profile can display the races by place awarded to the user in that race. In an embodiment, the profile can contain the participant's T-shirt size. In an embodiment, the participant's T-shirt size is provided to the race organizers upon registration. In an embodiment, the participant can show the race workers his/her profile to obtain their T-shirt.

In an embodiment, below the statistics, users can see their upcoming races. The "Upcoming Races" box contains any races the user has registered for that are upcoming. The users can also click the "Find More Races" button to search for additional races. They can see all upcoming races in the system and the distance of those races. In an embodiment, the user can limit the search for upcoming races by the geographic location of that race or distance of the race.

In an embodiment, below the Upcoming Races box, the users can see their Race Times. The Race Times box contains all the user's times for races they have run. They can click any of their race times to visit the Race Page for that race.

Upon visiting the Race Page, the user will see some information about the race:
Race name
Race location (venue)
Race sponsor
Race date
Race city & state
Race check in time
Race start time
Race distance (in an embodiment, in kilometers)
Race promotional image
Race location on Google Maps
Race description
Quick link to get directions to the race in Google Maps If the race has not yet been completed, the user will see either the option to register, or their Bib Number (#). In an embodiment, by clicking the register button, the user will be asked to donate and then automatically registered for the race. In an embodiment, by clicking the register button, the user will be automatically registered for the race. In an embodiment, the information previously entered in the user profile is automatically extracted after clicking the register to provide the information needed for registration. The automatic registration creates a registration under the race in the database, and automatically assigns the user a Bib # starting from 1 and increasing incrementally. In an embodiment, the system will send a confirmation email or text to the user. In an embodiment, the email or text contains a check-in code to use to check-in on the day of the race. In an embodiment, the check-in code can be scanned at the race to provide digital check-in. In an embodiment, the system can send notification emails or texts to the participants of upcoming races. In an embodiment, a notification email or text can remind participants of races for which they have registered. In an embodiment, a notification email or text is to provide the participant an opportunity to register for an upcoming race.

In an embodiment, after the race has been run and the race times have been added, the user can see:
Their time for the race
All times for the race
The best 20 historical times at that race location (venue) (or other desired information)

In various embodiments, advantages of the platform include but are not limited to one or more of 1) pre-race and race day registration, 2) timing of the race, 3) uploading of timing statistics directly to the user's profile, 4) removing the necessity for a separate bib, 5) one click registration (making registration far easier, faster and better than current systems). In an embodiment, the platform calculates overall placement, overall gender placement, age group placements, and other common results each time the race results are viewed by someone. In an embodiment, the only data in the database is the raw times and each user's gender and age at time of registration. In an embodiment, the age group placements are gender specific, for example "Age group 20-29 female" and "Age group 20-29 male" etc.

The platform provides a "one-stop shop" for races to provide registration, timing, and uploading to the user's profile. In an embodiment, the platform includes a payment system for fee-based races.

Figure 2:
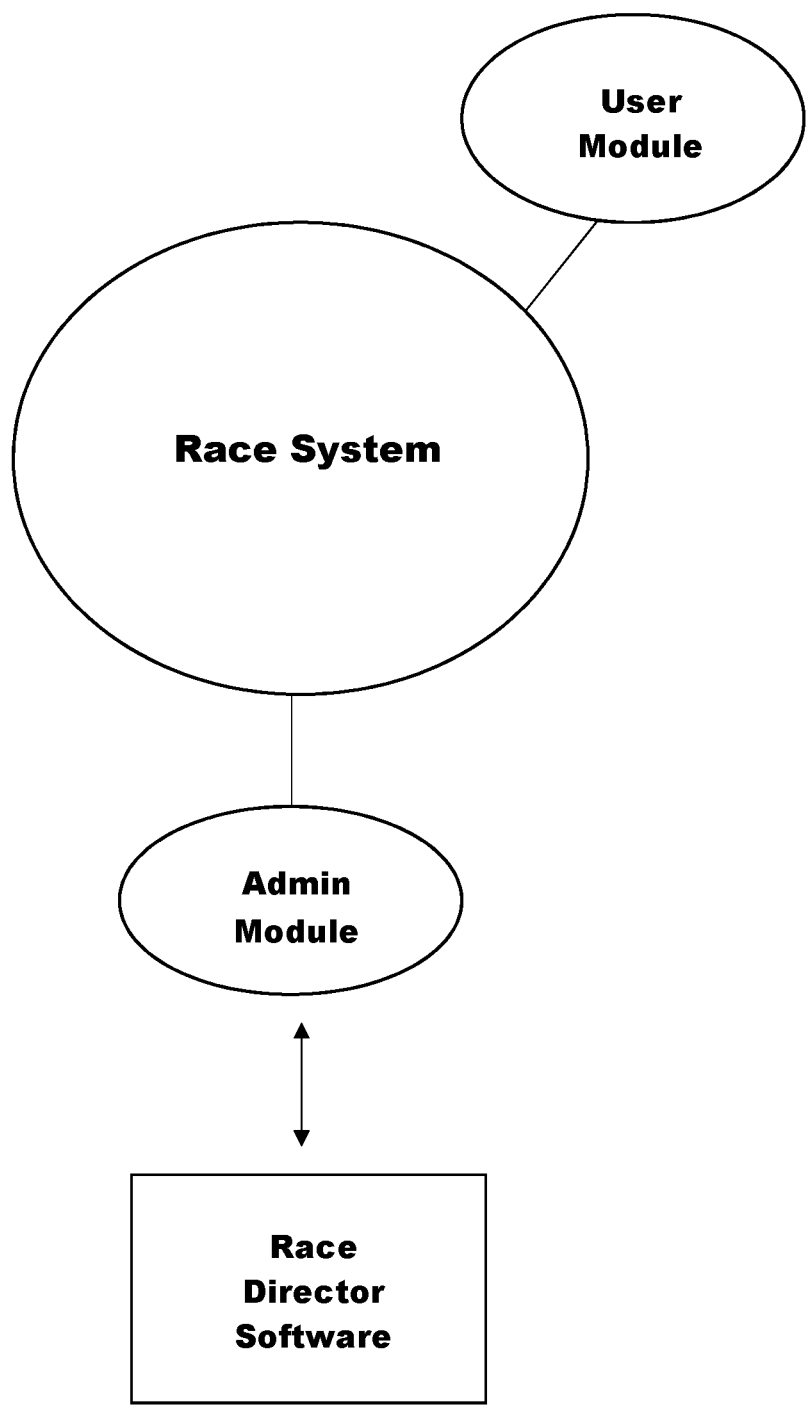
FIG. 2 is a diagram of various modules that can be in the system.

In an embodiment, administrators of the system will have an admin button on their dashboard. The admin button can be clicked to access the administrator module (admin module) of the system. FIG. 2 is a diagram of various modules that can be in the system 200. In an embodiment, the race system 202 communicates with a user module 204 and admin module 206. In an embodiment, the admin module 206 communicates with race director software 208.

In the administrator module, the administrator can see, for example, one or more of:
Total users online
Total users
Total registrations made
All races
All venues (race locations)
All users and their personal information In an embodiment, the administrator can edit any existing races and venues and create new races and venues. In an embodiment, races must be assigned to a venue. In an embodiment, the administrator can also export a file in comma-separated values (CSV) format of all or a subset of users for promotional emailing, etc. In an embodiment, the system can be used to provide a report of the race including selected information. However, any data format can be used with various embodiments of the present invention.

In an embodiment, the system accepts payment from the participants and handles timing functions, allowing the entity providing the system to provide a single payment back to the race organizers and all costs (including timing and fee for the system) have been subtracted from the registration payments. However, any form of payment system or payment method can be used.

When an administrator of the system is preparing for a race, they can open the race in the administrator module. The administrator can then export the bib assignments from the system directly to the race director software to time the race. FIG. 2. In an embodiment, a race director-compatible CSV file, or other data format, is created that includes the racers' information and reusable chip cards, such as a RFID Bib. In an embodiment, the software does not allow duplicate bib number assignments. A chip card reader and writer can write and read the chip cards at the race. Corresponding RFID bibs can then be given to each participant in the race. In an embodiment, the race director software will time the race and produce and export a file, which can be imported back into the system from the race administrator page. Once the export file is imported back into the system, race times are automatically assigned to the participants, and their placements are automatically generated (overall, by gender, and by age group). In an embodiment, the export file is a CSV file. However, any data format can be used. Administrators can also manually add times to the registered users after the race if they are not included in the race director's export file. Once the race data is imported, the users' dashboards will reflect the data. In an embodiment, the system is real time so data is shown as it is updated.

In various embodiments both the race participant(s) and the administrator(s) input information or data through one or more user interfaces. The user interfaces are capable of use for populating the one or more databases.

Figure 3:
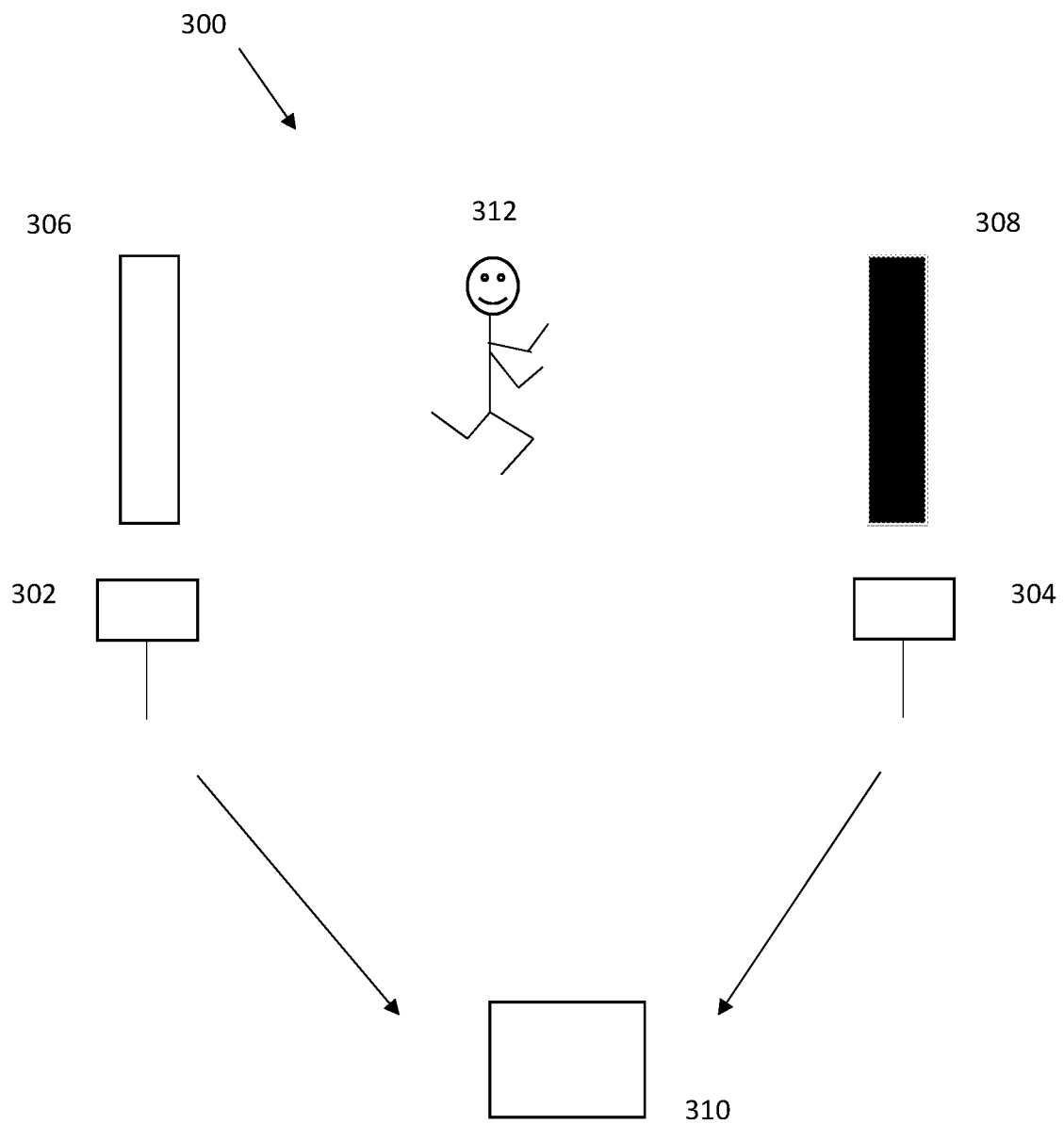
FIG. 3 depicts a diagram of an embodiment of a timing system.

FIG. 3 depicts a diagram of an embodiment of the race timing system 300. Prior to the race beginning, a first RFID reader 302 is assigned at the starting point 306 and a second RFID reader 304 is assigned at the terminal point 308. FIG. 3. In an embodiment, the same RFID reader may be assigned to the starting point and terminal point. After the race begins, the RFID tag numbers are read as participant(s) 312 with race bibs pass through the RFID reader at the starting point or at the terminal point, the tag numbers and times recorded by the RFID reader and transmitted to the server 306 are used to calculate the time each participant took to complete the course. In an embodiment, the time durations are used to rank the participants 312. In an embodiment, the participants 312 may start the race at different times. In an embodiment, the RFID reader times the race automatically.

Radio Frequency Identification (RFID) systems are useful when the number of objects is large and speed and accuracy of the process are essential. In the present system, the number of participants, speed of recording, precision of the times, and ability to register after the race has started would prohibit manual recording by a human. In an embodiment, a RFID tag comprises a microchip combined with an antenna and is attached to a race bib and is subsequently read by a RFID reader. In an embodiment, a race number is printed on a race bib. In an embodiment, a race bid is not necessary. The RFID tags store their data in read/write memory. The read/write memory can be accessed and modified after the tag manufacturing is complete. In an embodiment, during the registration process, the administrator of the system assigns a unique identification RFID tag number and a race number to each participant and stores the RFID tag number and the corresponding race number on a server, and establishes a data mapping between the RFID tag number and the corresponding race number. The RFID tag number can be written into the memory of the RFID tag by a RFID writer. The RFID reader and RFID writer can communicate with the server. In an embodiment, the race bibs with printed race numbers are embedded with RFID tags and have corresponding RFID tag numbers. In an embodiment, the participants run with the RFID tag without a race bib. In an embodiment, RFID tags are distributed to participants by mail or in person prior to or at the race. In an embodiment, a participant can apply to change the race number, and the server can change the race number and establish a data mapping between the RFID tag number and the changed race number. In an embodiment, the participant can receive a new race bib with the new race number along with taking the RFID tag from the old race bib and attaching it to the new race bib.

Further, a plurality of RFID readers may be disposed throughout the course of the race to provide participants with various sectional completion times.

In an embodiment, the system can integrate a GPS navigation system such that the system can monitor and track the participant during the pace. A participant can carry a mobile unit which can be used to receive signal of GPS satellites or other wireless positioning technology capable of determining its location. The geography location of the mobile unit will be displayed via characters or graphics on the mobile unit display. In addition, the data of the geography location of the mobile unit will periodically be communicated via a wireless link, through a global network to the server. The server collects the data of locations of all the participants in real time and processes and evaluates the received racing information and compares the information of all participants.

In an embodiment, the server can monitor the participants. For example, if a participant strays from the route of a long race, his/her location will be transmitted to the server, and the server can send a warning message to the participant via a wireless link and guide the participant back to the right route. In an embodiment, the server can also provide the participant a graphical map or satellite image view of the route and display them on the mobile unit display, and a participant can compare his/her location with the route on the mobile unit display and follow the route.

In an embodiment, the server has the ability of archiving, summarizing, and queuing the data of the locations of all the participants, and feedback some statistical information to the participants dynamically. For example, the server can transmit other participants' locations to a participant and display them on a graphical map on the mobile unit display such that the participant can estimate the situation during the racing and formulate corresponding strategy to win. In an embodiment, a participant can send message to the server and order special statistical information. for example, a participant can require the server to provide the positions of the first three participants and the distances from him/her or the positions of the best historical performing participants and the distances from him/her during the racing such that the participant can estimate the situation during the racing and formulate corresponding strategy to win.

In an embodiment, the GPS navigation system can incorporate the RFID tags to a race time reporting system. The positioning accuracy of commercial GPS navigation system is about 3 meters but the positioning accuracy of the RFID can be millimeter level. The RFID reader can acquire more accurate position information than the GPS navigation system nearby the starting point and the terminal point of the race route. The RFID tags are used to determine the starting time and finishing time of the participants during race. In an embodiment, the GPS navigation system can be used to provide the participants' location information to facilitate management.

In an embodiment, if a RFID reader at the starting point detects a participant pass through the starting point, it records the starting time of the participant and transmits the information involving the participant's RFID tag number and the starting time to the server, Once the server receives this message, it send a message to a GPS navigation system carried by the participant to command the GPS navigation system to start to work, the data of the geography location of the participant will periodically be communicated via a wireless link, through a global network to the server. If a RFID reader at the terminal point detects a participant pass through the terminal point, it records the finishing time of the participant and transmits the information involving the participant's RFID tag number and the finishing time to the server, Once the server receives this message, it sends a message to a GPS navigation system carried by the participant to command the GPS navigation system to stop working.

In an embodiment, a system allows the user to create a profile on a webpage. Once the user creates a profile, he can select and register for races and be automatically assigned a bib number. In an embodiment, the participant can check online to find out their bib number. In an embodiment, the participant can request to change their bib number. Participants can register until the race starts and in embodiments, after the scheduled race start. In an embodiment, the participant can register until five minutes before the race start. In an embodiment, a physical bib is not necessary. When the participant arrives on race day, the participant will show his/her bib number to the check-in desk where he/she will receive a reusable chip with which to run. In an embodiment, the participant shows his/her bib number on their phone. In an embodiment, the participant shows a physical print out of his/her bib number. In an embodiment, the race workers/volunteers do not need to have a phone to verify registration. The reusable chip records the participant's time for the race. In an embodiment, the race has 2000 participants or less. In an embodiment, the race has more than 2000 participants. Once the race is over, the times are uploaded to the system where they are placed in the appropriate user's profile. In an embodiment, the profile keeps track of all of their race times, fastest time overall, gender, and age group placement along with the overall mileage the participant has run in the races.

Advantages of the system include but are not limited to one or more of:

Minimal equipment is needed

Lower costs for organizer

Lower costs for participants

Allows registration up to and after the start of the race

Participants can see their time instantly on their phone or computer via their dashboard (including how the participant did overall, in age group, and in gender)

The participant's dashboard automatically populates with each race, and its results, that uses this system The participant's dashboard can be password protected One or more children can be added to a participant's profile The information for a child's races can be transferred to their own profile when they are old enough to have a profile. Therefore, the system is capable of compliance with the Children's Online Privacy Protection Act (COPPA).

All of the compositions and methods disclosed and claimed herein can be made and executed without undue experimentation in light of the present disclosure. While the compositions and methods of this disclosure have been described in terms of preferred embodiments, it will be apparent to those of skill in the art that variations can be applied to the compositions and methods and in the steps or in the sequence of steps of the methods described herein without departing from the concept, spirit and scope of the disclosure. More specifically, it will be apparent that certain aspects that are related can be substituted for the aspects described herein while the same or similar results would be achieved. All such similar substitutes and modifications apparent to those skilled in the art are deemed to be within the spirit, scope and concept of the disclosure as defined by the appended claims.

What is claimed is:

1. A system for event administration comprising:
   a management platform comprising a server operationally connected to the Internet;
   a user interface;
   an event; and,
   at least one event participant,
   wherein the at least one event participant accesses the management platform to register for the event through the user interface; and
   wherein a time of registration for the event includes time upto and after the start of the event.

2. The system of claim 1, further comprising a database to store information about the event participant and the event.

3. The system of claim 2, wherein the information includes the event participant's password.

4. The system of claim 2, wherein the information is in a CSV file.

5. The system of claim 2, wherein the server can access the database.

6. The system of claim 1, further comprising an administrator module operated by an administrator of the system.

7. The system of claim 6, wherein the administrator can create and edit the event.

8. The system of claim 1, wherein the user interface is a webpage user interface.

9. The system of claim 8, wherein the webpage user interface comprises an account application for the event participant to create an account.

10. The system of claim 9, wherein the account application can verify that the event participant is a human.

11. The system of claim 9, wherein the server provides the event participant a dashboard after the event participant creates an account.

12. The system of claim 11, wherein the dashboard includes a profile.

13. The system of claim 6, wherein the profile includes information of the event participant's statistics.

14. The system of claim 1, wherein the management platform assigns an event number for the event to the event participant at the time of registration for the event and communicates the event number to the event participant.

15. The system of claim 14, wherein the event number is stored in a RFID tag.

16. The system of claim 1, wherein the event is a race.

17. The system of claim 16, wherein the race is selected from a foot race, a bike race, a trail race, a swim race, a car race, a boat race, a flying race, a balloon race, and any other race wherein a race registrant requires the assignment of an event number.

18. The system of claim 16, further comprising an event timing system.

19. The system of claim 18, wherein the event timing system is operationally connected to the management platform.

20. The system of claim 18, wherein the event timing system records at least a starting time of the event participant and a terminal time.

* * * * *